3,403,140
POLYMERIZATION PROCESS AND CATALYST
Charles W. Moberly, Bartlesville, Okla., assignor to Phillips Petroleum Company, a corporation of Delaware
No Drawing. Continuation-in-part of application Ser. No. 372,685, June 4, 1964. This application Jan. 25, 1965, Ser. No. 427,965
8 Claims. (Cl. 260—93.7)

This is a continuation in part of Ser. No. 372,685, filed June 4, 1964 and now abandoned.

This invention relates to the polymerization of olefins to form solid polymers. In one aspect it relates to an improved catalyst for such a polymerization. In another aspect it relates to a process for producing solid polymers of olefins in increased yields.

It is known in the art to polymerize aliphatic 1-olefins such as propylene and 1-butene to form crystalline solid polymers. Catalysts for such a process are often formed by mixing together a compound having a metal-carbon bond with a compound of a transition metal. The activities of various of these catalysts can be improved by the addition of other compounds. Thus, for example, a catalyst which forms on the admixing of an alkylaluminum halide with a titanium halide can be improved by the addition to this mixture of a third component such as an organic phosphine. Still other components can be added to increase activity. Catalysts and processes of this type are disclosed in United States Patents 2,832,759 (1958) and 3,051,692 (1962). It is also known to produce crystalline polypropylene in high yields by the use of a catalyst which forms on mixing a dialkylaluminum chloride or iodide with a complex which forms on the reaction of titanium tetrachloride with metallic aluminum. This type catalyst and process are disclosed in British Patent 940,178.

Catalysts of the organometal type vary widely in activity and in the properties of the polymers which they produce. In the production of crystalline polypropylene, it is desirable to obtain not only high yields in the polymerization process but also a polymer which has a flexural modulus of at least 200,000 p.s.i. Very few catalysts among the many of this type which have been proposed in the art produce polypropylenes having the required flexural modulus in yields sufficiently high to be economical. While there have been various proposals to modify the activity of catalysts of the type hereinbefore referred to, many of the adjuvants do not increase yield without damaging other properties of the polymer, such as flexural modulus.

An object of this invention is to provide an improved catalyst. A further object of the invention is to increase yields of polyolefins such as polypropylene without damaging other properties such as flexural modulus. A further object is to render catalyst systems having very low polymerization activity highly active. Other objects and advantages will become apparent to those skilled in the art upon considering this disclosure.

According to this invention, the yield and/or flexural modulus of polyolefins is improved by carrying out the polymerization with a catalyst system formed on mixing (a) a compound of the formula $RAlX_2$, (b) a compound of the formula $R_3M$, (c) a titanium trichloride-aluminum trichloride complex prepared by reaction of titanium tetrachloride and aluminum and having the approximate formula $TiCl_3 \cdot \frac{1}{3} AlCl_3$, and (d) a compound having the formula $R_yM'X_z$ wherein R in the foregoing formulae is selected from the group consisting of alkyl, aryl, cycloalkyl, alkenyl and cycloalkenyl radicals and combinations thereof such as alkaryl, aralkyl, etc., having 1 to 20 carbon atoms, more preferably 1 to 10 carbon atoms, M is a group V–A element, preferably phosphorus, M' is a group I–A, II or III–A metal, X is a halogen, preferably chlorine, bromine or iodine, $y+z$ is equal to the valence of M', $y$ is 1, 2 or 3, and $z$ is 0 or 1. Compound (d) is preferably $R_2Zn$ and most preferably dialkylzinc. (Periodic System of Lange, Handbook of Chemistry, 8th Edition, pages 56–57.)

In forming the foregoing catalyst, the molar ratio of organoaluminum halide ($RAlX_2$) to organo-group V–A compound is in the range of 1:5 to 5:1, preferably 1:2 to 2:1. The molar ratio of $RAlX_2$ to titanium complex (as $TiCl_3 \cdot \frac{1}{3} AlCl_3$) is most frequently in the range 0.25 to 10:1, preferably 2:1 to 10:1, and more preferably 3:1 to 7:1. The molar ratio of $R_yM'X_z$ to titanium complex is in the range 0.25:1 to 5:1, preferably 0.25:1 to 3:1, and more preferably 0.5:1 to 1.5:1. The stated ranges are those which provide the most satisfactory results. However, ratios outside these ranges can be used.

The compounds represented by the formula $RAlX_2$ are well known in the art. Examples are ethylaluminum dichloride, ethylaluminum dibromide, ethylaluminum diiodide, n-propylaluminum dichloride, n-amylaluminum dibromide, tert-butylaluminum dichloride, eicosylaluminum diiodide, cyclohexylaluminum dichloride, phenylaluminum dichloride, 3-methylphenylaluminum dibromide, paratolylaluminum difluoride, 4-phenyl-2-cyclohexenylaluminum difluoride, 3-propylbenzylaluminum dichloride, benzylaluminum diiodide, and alpha-naphthylaluminum dichloride. Preferably, an alkylaluminum dichloride is used.

The organo-group V–A compounds ($R_3M$) utilized to form the catalyst according to this invention are also well known in the art. They include triethyl phosphine, tri-n-butyl phosphine, ethyl di-tert-butyl phosphine, tricyclohexyl phosphine, triphenyl phosphine, the tritolyl phosphines, the tricresyl phosphines, tribenzyl phosphine, triethylamine, tribenzylamine, triphenylamine, tricyclohexylamine, trinonylamine, trihexadecylamine, trieicosylamine, trivinylamine, triallylamine, tri(5-octenyl)amine, tri(3-methylcyclopentyl)amine, tri(3 - allylphenyl)amine, tri(2-naphthyl)amine, tri(9-anthryl)amine, tripropylarsine, tri(phenylbutyl)arsine, triethylarsine, triphenylarsine, tribenzylarsine, tri(10-phenanthryl)amine, tri(3-allylcyclohexyl)amine, tri(5,6-dimethyl-1-chrysenyl)amine, triethylstibine, tributylstibine, tribenzylstibine, triphenylstibine, tridodecylstibine, trioctadecylstibine, tri(5-decenyl)stibine, tri(2-pyrenyl)stibine, tri(2-cyclohexenyl)stibine, triethylbismuthine, triphenylbismuthine, tribenzylbismuthine, trihexylbismuthine, tri(3-hexadecenyl)bismuthine, tri(3,4 - dimethyl - 5,6-diisobutyl-1-naphthyl)bismuthine, triallylbismuthine, tricyclopentylbismuthine, tri-(2,3-dihexylcyclohexyl)bismuthine, and the like.

The titanium chloride-aluminum chloride complex utilized according to this invention is also well known in the art. It can be formed by reacting titanium tetrachloride with metallic aluminum. The complex can be represented by the formula $3TiCl_3 \cdot AlCl_3$ (or $TiCl_3 \cdot \frac{1}{3} AlCl_3$).

The organometal compounds ($R_yM'X_z$) used in accordance with this invention are also well known in the art. They include diethylzinc, diisopropylzinc, di-n-butylzinc, di-n-octylzinc, dicyclopentylzinc, dicyclohexylzinc, diphenylzinc, phenylparatolylzinc, di-betanaphthylzinc, n-butyllithium, diethylcadmium, diethylmagnesium, triethylaluminum, triethylgallium, isooctylsodium, phenylpotassium, 1-naphthylrubidium, ethylberyllium fluoride, 7-phenanthrylcalcium iodide, 3-hexylcyclohexylmercury bromide, allylbarium chloride, dieicosylzinc, di-10-hexadecenylindium chloride, trihexylboron, diethylaluminum chloride, triphenylgallium, tribenzylthallium, tri-1-naphthacenylaluminum, 2 - phenyl - 4 - cyclohexenylstrontium chloride, ditolylgallium bromide, tri(7,8-dimethylchrysenyl)aluminum, di(3,4 - diisopropyl-7,8-diethylnaphthyl) gallium chloride, diallylmagnesium, dioctylgallium iodide, and the like. Mixtures of two or more of the compounds in each group of catalyst ingredients described can be employed if desired.

The olefins which are polymerizable in accordance with this invention are aliphatic olefins having up to 8 carbon atoms per molecule. The greatest benefits are obtained in polymerization of aliphatic 1-olefins having from 3 to 7 carbon atoms per molecule, e.g. propylene, 1-butene, 1-pentene, 1-hexene and 4-methyl-1-pentene.

The polymerization is most frequently conducted in the temperature range 80 to 250° F., and more frequently 100 to 200° F. The pressure used is merely sufficient pressure to maintain the reaction mixture substantially in the liquid phase. While an inert hydrocarbon diluent, e.g. a paraffin, cycloparaffin, or aromatic hydrocarbon having up to 20 carbon atoms per molecule, can be utilized, it is frequently advantageous to conduct the reaction without a diluent, especially when propylene is being polymerized. Under these circumstances, liquid propylene acts as the reaction medium. The reaction time is generally in the range 10 minutes to 20 hours, more frequently 30 minutes to 5 hours.

It is frequently desirable, for controlling the molecular weight of the polymer, to utilize from about 0.08 to about 0.30 mol percent of hydrogen in the system. When propylene is being polymerized in a mass polymerization system, it is desirable to dissolve this amount of hydrogen in the liquid propylene before passing the propylene into the polymerization reactor.

The total catalyst concentration in the reaction mixtures according to this invention is usually in the range 0.005 to 10 weight percent, but concentrations outside this range are operative.

The product polymers in accordance with this invention can be recovered from the reaction mixture by processes well known in the prior art. Thus the product polymer can be contacted with a chelating compound such as a diketone to remove catalyst residues and further contacted with a hydrocarbon such as n-pentane or liquid propylene to remove remaining traces of catalyst and chelating agent as well as any small amount of polymer fraction which may be soluble in light hydrocarbons at temperatures of the order of 80 to 100° F.

In the commercial production of polypropylene, it is desirable that the hydrocarobn-soluble content be maintained at a low level. One advantage of this invention is that product polymer contains only small amounts of hydrocarbon-soluble fractions.

The following examples will further illustrate the invention, although it is not intended that the invention be limited thereto.

Example I

In a series of runs illustrating specific embodiments of this invention, propylene was polymerized in a mass polymerization system, i.e. as liquid propylene without a diluent. The catalyst was formed by mixing ethylaluminum dichloride, triphenyl phosphine, titanium trichloride-aluminum chloride complex and diethylzinc, and about 0.1 mol percent hydrogen was used in all runs.

The polymer was recovered substantially as hereinbefore described. In addition, other combinations of the catalyst ingredients were utilized to illustrate the desirability of the four catalyst ingredients in accordance with this invention. The following results were obtained.

| Run No. | Temperature, °F. | Mol Ratio EADC: $\phi_3$P:Et$_2$Zn:TiCl$_3 \cdot \frac{1}{3}$ AlCl$_3$ | Total Catalyst Concen., Wt. Percent | Rate, gm./gm. TiCl$_3$ Complex/hr. | Flex Mod.,[1] p.s.i.×10$^{-3}$ |
|---|---|---|---|---|---|
| 1 | 130 | 5:5:0:1 | 0.588 | 90.8 | 230 |
| 2 | 130 | 5:5:1:1 | 0.906 | 160 | 236 |
| 3 | 130 | 5:5:0.5:1 | 0.873 | 102 | 264 |
| 4 | 130 | 5:5:0.25:1 | 0.856 | 92 | 240 |
| 5 | 145 | 5:5:0:1 | 0.536 | 83 | 228 |
| 6 | 145 | 5:5:1:1 | 0.891 | 158 | 219 |
| 7 | 160 | 5:5:0:1 | 0.515 | 126.7 | 223 |
| 8 | 160 | 5:5:1:1 | 0.906 | 214 | 205 |
| 9 | 175 | :5:0:1 | 0.545 | 94.5 | 235 |
| 10 | 175 | 55:51:1 | 0.891 | 264 | 240 |
| 11 | 130 | 0:0:1:1 | 0.127 | 2 | -------- |
| 12 | 130 | 0:5:1:1 | 0.653 | 2 | -------- |
| 13 | 130 | 0:0:5:1 | 0.322 | 32 | -------- |
| 14 | 130 | 5:0:0:1 | 0.217 | 10 | ([2]) |

[1] ASTM Method D-790-61.
[2] Liquid.

Of the foregoing runs, Runs 2, 3, 4, 6, 8 and 10 illustrate the invention. It will be noted that improved yields were obtained in all cases, as compared with the catalysts in which less than the four components of this invention were utilized. In addition, the polymers obtained did not suffer from significantly decreased flexural modulus. Furthermore, these polymers contained from 2 to 3 weight percent of fractions soluble in xylenes at room temperature.

Example II

A series of runs were carried out in the same manner as those of Example I. A 2.5 hour reaction period at 130° F. and 325 p.s.i.g. with 250 g. propylene and 1 liter H$_2$ present was employed. The following results were obtained.

| Run No. | Mole Ratio EADC: $\phi_3P:R_yM'X_z:TiCl_3\cdot\frac{1}{3}AlCl_3$ | $R_3M$ | $R_yM'X_z$ | Total Catalyst Concn.,[2] Wt. Percent | Rate, g./g. of $TiCl_3\cdot\frac{1}{3}AlCl_3$/ hr. | Flex. Mod.[1] p.s.i. ×10⁻³ |
|---|---|---|---|---|---|---|
| 15 | 5:5:2:1 | $\phi_3P$ | $Et_2Cd$ | 1.005 | 103 | 207 |
| 16 | 5:5:1:1 | $\phi_3P$ | $Et_2Cd$ | 0.923 | 103 | 237 |
| 17 | 5:5:2:1 | $\phi_3P$ | $\phi_2Mg$ | 1.008 | 286 | 79 |
| 18 | 5:5:1:1 | $\phi_3P$ | $\phi_2Mg$ | 0.920 | 149 | 153 |
| 19 | 5:5:1:1 | $\phi_3P$ | $Et_3Al$ | 0.914 | 170 | 225 |
| 20 | 5:5:0.5:1 | $\phi_3P$ | $Et_3Al$ | 0.872 | 124 | 225 |
| 21 | 5:5:0.25:1 | $\phi_3P$ | $Et_3Al$ | 0.875 | 55 | 231 |
| 22 | 5:5:2:1 | $\phi_3P$ | $EtZnCl$ | 0.967 | 94 | 251 |
| 23 | 5:5:1:1 | $\phi_3P$ | $EtZnCl$ | 0.915 | 98 | 253 |
| 24 | 5:5:2:1 | $\phi_3P$ | $Et_3Ga$ | 0.981 | 175 | 252 |
| 25 | 5:5:1:1 | $\phi_3P$ | $Et_3Ga$ | 0.911 | 160 | 231 |
| 26 | 5:5:0.5:1 | $\phi_3P$ | $Et_3Ga$ | 0.894 | 134 | 252 |
| 27 | 5:5:2:1 | $\phi_3P$ | $n\text{-}BuLi$ | 0.899 | 111 | 244 |
| 28 | 5:5:0:1 | $\phi_3P$ | None | 0.592 | 91 | 230 |
| 29 | 2.5:2.5:1.5:1 | $\phi_3P$ | $Et_2Zn$ | 0.538 | 199 | 217 |
| 30 | 2.5:2.5:2:1 | $\phi_3P$ | $Et_2Zn$ | 0.580 | 174 | 200 |
| 31 | 2.5:2.5:2.5:1 | $\phi_3P$ | $Et_2Zn$ | 0.595 | 118 | 211 |
| 32 | 5:5:2:2 | $\phi_3P$ | $Et_2Mg$ | 0.512 | 382 | 100 |
| 33 | 5:2.5:0:1 | $nBu_3Sb$ | | 0.618 | 10 | |
| 34 | 5:2.5:1:1 | $nBu_3Sb$ | $Et_2Zn$ | 0.679 | 40 | 244 |
| 35 | 2.5:2.5:1:1 | $Bz_3N$ | $Et_3Al$ | 0.547 | 173 | 268 |
| 36 | 2.5:2.5:1.5:1 | $Bz_3N$ | $Et_3Al$ | 0.562 | 209 | 239 |
| 37 | 2.5:2.5:2.0:1 | $Bz_3N$ | $Et_3Al$ | 0.574 | 234 | 218 |
| 38 | 2.5:2.5:2.5:1 | $Bz_3N$ | $Et_3Al$ | 0.609 | 256 | 219 |
| 39 | 5:5:2:2 | $Bz_3N$ | $Et_2Mg$ | 0.527 | 206 | 160 |
| 40 | 5:2.5:1:1 | $Et_3N$ | $Et_3Al$ | 0.459 | 96 | 215 |
| 41 | 2.5:2.5:1:1 | $Et_3N$ | $Et_3Al$ | 0.329 | 171 | 195 |
| 42 | 2.5:2.5:0:1 | $(C_3H_5)_3N$ | | 0.348 | 33 | 219 |
| 43 | 5:5:1:1 | $(C_3H_5)_3N$ | $Et_3Al$ | 0.664 | 163 | 221 |
| 44 | 5:2.5:1:1 | $(C_3H_5)_3N$ | $Et_3Al$ | 0.526 | 64 | 229 |
| 45 | 2.5:2.5:1:1 | $(C_3H_5)_3N$ | $Et_3Al$ | 0.389 | 158 | 206 |

[1] ASTM D-790-61.
[2] Based on propylene.

Note.—$\phi$ means phenyl; Bz means benzyl; Et means ethyl; n-Bu means n-butyl; and $C_3H_4$ is the allyl group.

Other catalyst systems according to my invention include:

Ethyl aluminum difluoride
Tris(p-tolyl)phosphine
Di-n-propyl zinc
Titanium trichloride-aluminum chloride complex Isopropyl aluminum dibromide
Tris(2,4-dimethylphenyl)phosphine
Diisobutyl zinc
Titanium trichloride-aluminum chloride complex Ethyl aluminum diiodide
Tribenzyl phosphine
Diethyl zinc
Titanium trichloride-aluminum chloride complex n-Propylaluminum dichloride
Triphenylamine
Dicyclopentylcadmium
Titanium trichloride-aluminum chloride complex Eicosylaluminum diiodide
Tri(2-naphthyl)amine
Triethylgallium
Titanium trichloride-aluminum chloride complex Phenylaluminum dichloride
Triphenylarsine
Trieicosylboron
Titanium trichloride-aluminum chloride complex p-Tolylaluminum dichloride
Trioctadecylstibine
Tribenzylthallium
Titanium trichloride-aluminum chloride complex Benzylaluminum diiodide
Triethylbismuthine
Diallylmagnesium
Titanium trichloride-aluminum chloride complex Cyclohexylaluminum dibromide
Tri(2-cyclohexenyl)stibine
Allylbarium chloride
Titanium trichloride-aluminum chloride complex Cyclopentylaluminum dibromide
Tricyclopentylarsine
Ethylberyllium fluoride
Titanium trichloride-aluminum chloride complex Reasonable variations and modifications of this invention can be made, or followed, in view of the foregoing disclosure, without departing from the spirit or scope thereof.

I claim:

1. A process which comprises polymerizing an aliphatic 1-olifin having up to 8 carbon atoms per molecule in the presence of a catalyst which forms on mixing a compound having the formula $RAlX_2$, a compound having the formula $R_3M$, a titanium trichloride-aluminum trichloride complex having the formula $TiCl_3\cdot\frac{1}{3}AlCl_3$ and a compound having the formula $R_yM'X_z$, wherein R in the formulae is selected from the group consisting of alkyl, cycloalkyl, aryl, alkenyl and cycloalkenyl radials having from 1 to 20 carbon atoms per molecule and and combinations thereof, X is a halogen, M is a group V–A element, M' is a member of the group consisting of zinc, cadmium, aluminum, gallium and lithium metals, $y+z$ is equal to the valence of M', y is an integer from 1 to 3, and z is an integer from 0 to 1, wherein the molar ratio of the compound having the formula $RAlX_2$ to the compound having the formula $R_3M$ is in the range of 1:5 to 5:1; the molar ratio of the compound having the formula $RAlX_2$ to titanium trichloride-aluminum trichloride complex is in the range of 0.25 to 10:1; and the molar ratio of the compound having the formula $R_yM'X_2$ to titanium trichloride-aluminum trichloride complex is in the range of 0.25:1 to 5:1.

2. A process according to claim 1 wherein the catalyst is formed by mixing ethylaluminum dichloride, triphenyl phosphine, titanium trichloride-aluminum chloride complex and diethylzinc.

3. A process according to claim 1 wherein the catalyst is formed by mixing ethylaluminum dichloride, triphenyl phosphine, titanium trichloride-aluminum chloride complex and diethylcadmium.

4. A process according to claim 1 wherein the catalyst is formed by mixing ethylaluminum dichloride, triphenyl phosphine, titanium trichloride-aluminum chloride complex and triethylaluminum.

5. A process according to claim 1 wherein the catalyst is formed by mixing ethylaluminum dichloride, triallylamine, titanium trichloride-aluminum chloride complex and triethylaluminum.

6. A process according to claim 1 wherein the catalyst is formed by mixing ethylaluminum dichloride, tribenzylamine, titanium trichloride-aluminum chloride complex and triethylaluminum.

7. A process which comprises polymerizing, propylene in the presence of a catalyst which forms on mixing an alkylaluminum dichloride wherein the alkyl group contains from 1 to 10 carbon atoms, a triaryl phosphine wherein the aryl groups contain up to 10 carbon atoms each, a titanium trichloride-aluminum trichloride complex having the formula $TiCl_3 \cdot \frac{1}{3} AlCl_3$, and a dialkylzinc wherein the alkyl groups have from 1 to 10 atoms each, the polymerization being conducted in the liquid phase at a temperature in the range 80 to 250° F., the molar ratio of alkylaluminum chloride to phosphine being in the range 1:5 to 5:1, the molar ratio of alkylaluminum chloride to titanium chloride complex being in the range 0.25:1 to 10:1, and the molar ratio of dialkylzinc to titanium trichloride complex being in the range 0.25:1 to 5:1.

8. A process which comprises polymerizing propylene at a temperature in the range 100 to 200° F. in the presence of a catalyst which forms on mixing ethlyaluminum dichloride, triphenyl phosphine, titanium trichloride-aluminum trichloride complex having the formula $TiCl_3 \cdot \frac{1}{3} AlCl_3$, and diethylzinc, the molar ratio of ethylaluminum dichloride to triphenyl phosphine being in the range 1:2 to 2:1, the molar ratio of ethylaluminum dichloride to titanium chloride complex being in the range 3:1 to 7:1, and the ratio of diethylzinc to titanium chloride complex being in the range 0.5:1 to 1.5:1.

References Cited

UNITED STATES PATENTS

| | | | |
|---|---|---|---|
| 3,245,973 | 4/1966 | Natta et al. | 260—93.7 |
| 3,240,773 | 3/1966 | Boor | 260—93.7 |
| 3,222,337 | 12/1965 | Coover et al. | 260—88.2 |
| 3,168,506 | 2/1965 | Hoeg et al. | 260—93.7 |
| 3,155,626 | 11/1964 | Boor | 260—93.7 |
| 3,147,241 | 9/1964 | Moberly | 260—93.7 |
| 3,081,287 | 3/1963 | Coover et al. | 260—93.7 |
| 3,010,787 | 11/1961 | Tornqvist | 260—93.7 |
| 2,971,925 | 2/1961 | Winkler | 252—429 |

FOREIGN PATENTS 880,747 10/1961 Great Britain.

OTHER REFERENCES

Kresser, Polypropylene, Reinhold Publishing Corp., New York, 1960, TP 986, P56K72, pages 49–50.

JOSEPH L. SCHOFER, *Primary Examiner.*

M. KURTZMAN, *Assistant Examiner.*